Figure 1:
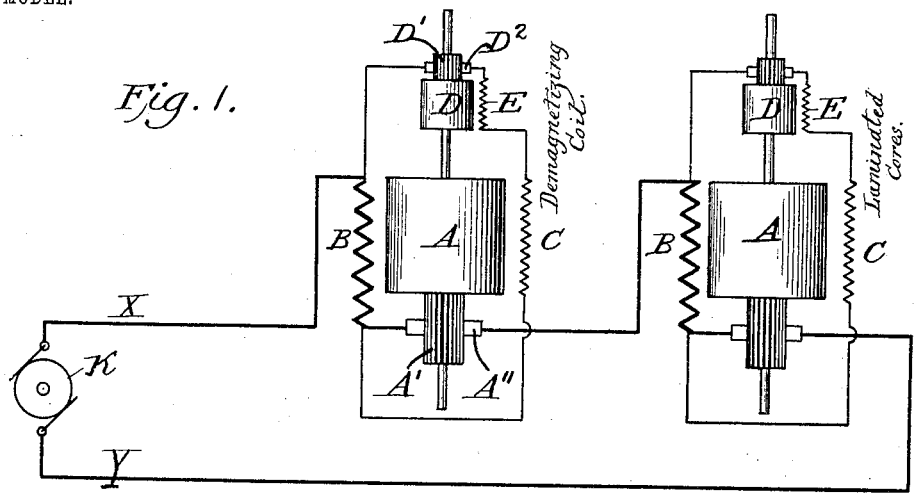

No. 768,467. PATENTED AUG. 23, 1904.
M. LEBLANC.
CONSTANT CURRENT SERIES MOTOR.
APPLICATION FILED FEB. 26, 1903.
NO MODEL.

Witnesses
F. N. Roehrich
F. T. Chapman.

Inventor,
Maurice Leblanc,
By his Attorneys

No. 768,467.

Patented August 23, 1904.

UNITED STATES PATENT OFFICE.

MAURICE LEBLANC, OF PARIS, FRANCE, ASSIGNOR TO WESTINGHOUSE ELECTRIC AND MANUFACTURING COMPANY, A CORPORATION OF PENNSYLVANIA.

CONSTANT-CURRENT SERIES MOTOR.

SPECIFICATION forming part of Letters Patent No. 768,467, dated August 23, 1904.

Application filed February 26, 1903. Serial No. 145,282. (No model.)

*To all whom it may concern:*

Be it known that I, MAURICE LEBLANC, a citizen of the Republic of France, residing at Villa Montmorency, No. 1 Avenue de Bouffleurs, Paris, France, have invented a new and useful Improvement in Regulators for Constant-Current Series Motors, of which the following is a specification.

The object of this invention relates to the regulation of a motor whose field has a series winding which is placed in a main line through which direct current of constant strength is at all times made to pass by properly regulating the generators in said main line in any well-known manner. Now it is well known that if we disregard armature reactions such a motor under such conditions has no definite speed for a given load. It is as likely to run fast and even to race as to run slow; but if we take into account armature reactions we find there is a certain permissible maximum load which the motor may carry. If greater load than this maximum load is placed upon the motor, it will not start. If the maximum load or a load very nearly equal to the maximum load is placed upon the motor, the motor will start and run at slow speed. If this load be now diminished, the motor speeds up until the hurtful electric reactions, the eddy-currents, and the mechanical friction of the motor at the greater speed added to the diminished load on the motor produce a new state of equilibrium at some higher speed. At a load considerably below the maximum the motor will run at a very high speed indeed, which means that it will race. Such automatic regulation of a series-wound motor supplied by a direct current of constant strength as has just been discussed is naturally very inefficient.

It is the object of my invention to devise an efficient arrangement of electrical apparatus so as to vary the field of a series-wound motor fed with constant direct current with relation to its velocity, so that this velocity shall never exceed such an arbitrarily-fixed maximum as I may choose to select, no matter how small the load, and shall, in fact, be not far from constant. To this end I take a dynamo and arrange it to revolve at a speed which shall be uniform with relation to the speed of the motor. Thus I may mount the dynamo upon the shaft of the motor so as to insure that when the motor runs slowly the dynamo shall run slowly and when the motor runs fast the dynamo shall run correspondingly fast. I thereupon so design this dynamo and electrically connect it to the motor in such a manner that at slow speeds of the motor, and therefore slow speeds of the dynamo, the dynamo shall furnish practically no current to the motor-field opposing the effect of its series winding; but as the motor reaches its selected maximum speed, no matter whether the load be great or small, the now more rapidly revolving dynamo shall quite suddenly furnish sufficient opposing current to the motor-field to practically neutralize the motor-field. In this way it is seen that the speed of the motor can never exceed the selected maximum, for when the motor reaches this maximum speed the dynamo, which now revolves rapidly, suddenly generates an opposing current sufficient to practically wipe out the motor-field, which means that the motor must slow down.

The dynamo should be self-exciting. Its design will be such that the magnetization of its field will not build up to any appreciable extent at slow speeds, but that it will build up quite rapidly at a speed corresponding to the preselected maximum speed of the motor. Furthermore, it is desirable that the field of this dynamo should have very little residual magnetism and that its armature-circuit be closed in derivation upon the series winding of the motor-field, so that the field of the dynamo may always have an initial excitation, which is, however, very small, from which its field can be built up when the proper velocity has been reached without relying upon any residual magnetism in the dynamo.

Figure 2:
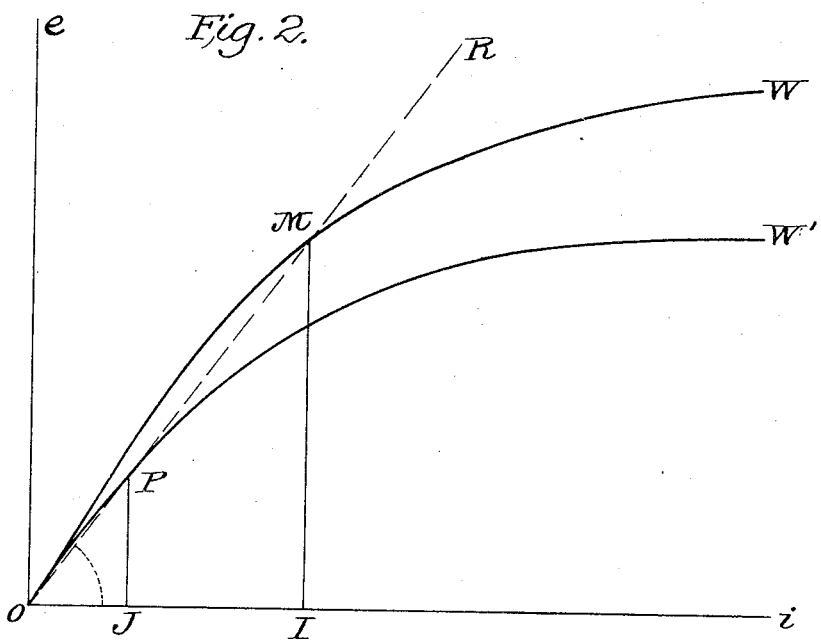

In the drawings, Figure 1 shows a diagram of a main circuit containing motors and reglating-dynamos connected therewith, and Fig. 2 shows the characteristics of the regulating-dynamo.

The main dynamo K, which is indicated conventionally, feeds a main circuit XY with a direct current of constant strength. In this main circuit are placed one or more direct-current motors A, having commutators A' and brushes A'', which brushes are in series with the field-winding B of the motor. Mounted upon the motor-shaft or arranged with respect to the motor in any other suitable way to produce a constant relative speed is a small dynamo C, which is wound to be self-exciting. I have indicated a series-wound dynamo, the series field-coil E of which is mounted in series with the brushes $D^2$, which bear upon the commutator D' of the dynamo D. The armature-circuit of this dynamo D supplies a winding C, which is mounted upon the field of the motor A in opposition to its field-winding B. This opposed winding C, I usually make of high resistance—that is, of fine wire—and I further prefer to mount the external circuit of the dynamo D, which contains the opposed winding C, in derivation of the field-winding B of the motor or in derivation of a part of this winding. In this manner I secure the presence of a small exciting-current in the field-winding E of the dynamo D without having to rely on any residual magnetism in the dynamo, which residual magnetism it is of advantage to make as nearly equal to zero as possible. I also arrange the connections so that the current which initially passes through the coil C as a branch of the main-line current is opposed in magnetic effect to the current in the coil B. Nevertheless the current which traverses the opposed winding C will be small at low speeds of the motor, and therefore of the dynamo, so that at such speeds the counter magnetizing force due to the opposed winding C will be negligible with respect to the magnetizing force of the series winding B of the motor. The strength of the field of the motor at slow speeds will thus not be sensibly diminished by the presence of the dynamo D and the opposed winding C.

As the motor and in consequence the dynamo increase in speed the strength of the current in the winding C will increase; but it will increase very slowly at first and then very suddenly, when the velocity of the dynamo has become sufficient to permit it to build up its excitation. The dynamo is so designed that this last-mentioned velocity shall correspond to the maximum velocity which it is desired that the motor shall have irrespective of the size of the load and that the current generated by the dynamo at this velocity shall be sufficient when traversing the opposed winding C to neutralize the magnetizing effect of the series winding B of the motor, and therefore to practically wipe out the magnetic field of the motor. It follows at once that the motor, no matter whether its load be great or small, can never attain a greater speed than such as corresponds to that speed of the dynamo at which its field excitation has built up sufficiently for it to produce such a current in the opposed winding C of the motor as will neutralize the field of the motor. It equally follows that a comparatively small diminution of the velocity of the motor, and therefore of the dynamo, below this maximum speed will, if its residual magnetism is negligible, bring about the withdrawal of the building-up action in the dynamo-field, so that the dynamo will no longer send an appreciable current into the opposed winding C of the motor.

I have already remarked that it is desirable to reduce the residual magnetism of the regulating-dynamo to the lowest possible point. I may further remark that it is desirable to thoroughly laminate the fields of the motor and of the regulating-dynamo to render their magnetic circuits very permeable in reducing the air-space to a minimum and not to saturate the iron.

I come now to an explanation of the characteristic curve of the regulator-dynamo with relation to the problem in hand. Referring to Fig. 2, I have shown a set of rectangular coördinates, the horizontal axis $Oi$ being taken to measure the current strength, and the vertical axis $Oe$ being taken to represent electrical pressure. It is well known that if a series-wound dynamo is run at a certain constant speed W the curve which represents the relation between current strength and electrical pressure under varying resistances in the current is of the general shape represented at OMW. I have drawn the straight line OR such that the tangent of the angle $ROi$ shall be equal to the total resistance in the armature-circuit of my regulator-dynamo. Under such assumptions it is explained in the text-books that when the regulator-dynamo is running at a speed W to supply a circuit of total resistance R the regulator-dynamo will give off a current proportional to the length OI under an electrical pressure proportional to the length IM. My regulator-dynamo must therefore be designed so that the length OI corresponds to the strength of current necessary to send into the opposed winding C of the motor A to nearly or completely neutralize the field of the motor or the effect of its series winding B at what now becomes a preselected maximum speed W, being the speed which the motor is never to exceed whether with a small or a large load. I speak of this speed as the "common maximum" speed predetermined alike for all loads. If now I further design my regulator-dynamo so that the portion of its characteristic curve OM for the maximum speed W very nearly coincides with the straight line OR, it will be found that the characteristic of the dynamo for a speed W' but little less than the maximum speed W will fall almost entirely below the straight line OR and will intersect this straight line in a point P very near the origin of coördinates. This means that at the arbitrarily-selected speed W', somewhat less than the maximum permitted speed W, the amount of current which the dynamo under the given assumption sends into the opposed winding C of the motor will be proportional to the the length OJ—that is to say, it will be very small. Knowing the amount of this opposing current, we can readily deduce therefrom the intensity of the motor-field and in consequence the value K' of the couple developed upon its axis when it turns with the velocity W'. This couple K' will be somewhat though but little less than the theoretical maximum couple K, which the motor has at starting or zero speed.

So long as we do not put a greater load upon the motor than corresponds to the couple K' the speed of the motor will not sink below the speed W'. Since this speed W' need be taken but little below the selected maximum speed W, as the characteristic curves on Fig. 2 show, it follows that so long as our motor is not required to overcome a resisting couple greater than K', which is but little less than the theoretical maximum couple K which the motor can stand, the speed of my motor will vary only between the limits W' and W, and these may be taken quite near together, as Fig. 2 shows. This means that my motor operates under practically constant speed from zero load up to that represented by the couple K'.

While I have spoken of completely neutralizing the motor-field at the maximum permitted velocity, it will be understood that in actual practice it may not ordinarily be necessary to completely neutralize this field.

I claim—

1. A line carrying a direct current of constant strength, a motor in the line having a field-winding in series with its armature, and a dynamo arranged to revolve at a uniform relative speed with the motor and to supply it with a current which practically neutralizes the motor-field at a certain common maximum velocity predetermined alike for all loads, substantially as described.

2. A line carrying a direct current of constant strength, a motor in the line having a field-winding in series with its armature, and a dynamo of low residual magnetization arranged to revolve at a uniform relative speed with the motor and to supply it with a current which practically neutralizes the motor-field when the motor has reached a common maximum velocity predetermined alike for all loads, substantially as described.

3. A line carrying a direct current of constant strength, a motor on the line having a field-winding in series with its armature, and a self-exciting dynamo of low residual magnetization arranged to revolve at a uniform relative speed with the motor and to supply it with a current which practically neutralizes the motor-field when the motor has reached a common maximum speed predetermined alike for all loads, substantially as described.

4. A line carrying a direct current of constant strength, a motor in the line having a field-winding in series with its armature, and a dynamo arranged to revolve at a uniform relative speed with the motor and to supply the motor-field with current opposed in effect to that of its series winding, said dynamo having the circuit which it supplies mounted in derivation of the series field of the motor, substantially as described.

5. A line carrying a direct current of constant strength, a motor in the line having a field-winding in series with its armature, and a dynamo of low residual magnetization arranged to revolve at a uniform relative speed with the motor and supplying a high-resistance winding on the motor-field with current opposed in effect to that of its series winding, said dynamo having the high-resistance winding which it supplies mounted in derivation of the series field-winding of the motor, substantially as described.

6. A line carrying a direct current of constant strength, a motor in the line having a field-winding in series with its armature and a field-winding opposed thereto, and a dynamo arranged to revolve at a uniform relative speed with the motor, which dynamo supplies the opposed field-winding of the motor, the dynamo being so proportioned that its characteristic curve, at the speed corresponding to the maximum speed of the motor for all loads, practically coincides, on the sides toward the origin, with the straight line representing the resistance of the dynamo-circuit, substantially as described.

7. A line carrying a direct current of constant strength, a motor in the line having a field-winding in series with its armature and a dynamo, having a series field-winding, arranged to revolve at a uniform relative speed with the motor and designed so as to suddenly build up its field magnetization, when a speed corresponding to the maximum desired speed of the motor for any and all loads is reached, to then supply to the motor-field a current which practically neutralizes it, substantially as described.

8. The combination with a constant direct-current-supply circuit, of a series-wound motor in said circuit, a regulating-dynamo of low residual magnetization driven by the motor and primed by a portion of the line-current, and demagnetizing-coils of high resistance upon the motor field-magnet and in the regulating-dynamo circuit, substantially as described.

In testimony whereof I have signed my name to this specification in the presence of two subscribing witnesses.

MAURICE LEBLANC.

Witnesses:
ARMAND LEBLANC,
AUGUSTUS E. INGRAM.